United States Patent [19]
Foehn

[11] 3,971,010
[45] July 20, 1976

[54] BALLASTED LOAD CONTROL SYSTEM AND METHOD

[75] Inventor: Robert C. Foehn, Novato, Calif.

[73] Assignee: FF & L Industries, Inc., South San Francisco, Calif.

[22] Filed: May 28, 1974

[21] Appl. No.: 473,744

[52] U.S. Cl. .................... 340/310 R; 340/310 A; 340/171 R
[51] Int. Cl.² .......................................... H04Q 9/00
[58] Field of Search ........ 340/310 A, 310 R, 171 R, 340/41; 307/3, 96, 106, 108

[56] References Cited
UNITED STATES PATENTS

| | | | |
|---|---|---|---|
| 2,177,843 | 10/1939 | Seeley | 340/310 A |
| 3,211,111 | 10/1965 | Morley | 340/310 A |
| 3,414,878 | 12/1968 | Smith | 340/41 |
| 3,467,835 | 9/1969 | DeCola | 340/310 A |
| 3,521,267 | 7/1970 | Lester | 340/310 A |
| 3,558,902 | 1/1971 | Casey | 340/310 A |
| 3,594,584 | 7/1971 | Woods | 340/310 A |

Primary Examiner—Harold I. Pitts
Attorney, Agent, or Firm—Flehr, Hohbach, Test, Albritton & Herbert

[57] ABSTRACT

System and method for controlling the energization of ballasted loads such as flourescent lights in which radio frequency control signals are superimposed on the power circuits which supply power to the loads. Frequency sensitive switching devices connect the loads to the conductors, and these switching devices are actuated in response to the control signals to energize only the desired loads.

7 Claims, 3 Drawing Figures

BALLASTED LOAD CONTROL SYSTEM AND METHOD

BACKGROUND OF THE INVENTION

This invention pertains generally to electric control systems and more particularly to a system and method for controlling the energization of ballasted loads such as flourescent and high intensity discharge lights.

With the energy crisis, people have become increasingly aware of energy saving measures, such as turning off unused electric lights and appliances and reducing the number of lights used to illuminate a given area. Electric lights are generally wired in banks in which a plurality of lights are energized by a circuit controlled and protected by a circuit breaker or fuse. The entire bank can be turned on and off as a whole with the switch or breaker, but individual control of the lights in the bank is not possible without additional wiring.

With incandescent lights, individual lamps can be removed or partially removed from their sockets to disconnect them from the energizing circuit, and they will draw no further energy. This technique cannot be successfully employed with flourescent lights or other ballasted loads. Even though the flourescent tubes are removed from their sockets, the ballasts remain connected to the circuit and continue to draw power. Prolonged energization of the ballast with the tubes removed can damage or destroy the ballast.

SUMMARY AND OBJECTS OF THE INVENTION

The system and method of the invention permit ballasted loads to be selectively disconnected from a power circuit without disturbing other loads connected to the circuit and without substantial modification of existing wiring. According to the invention, radio frequency control signals are applied to the power circuit conductors at a convenient location remotely of the loads. Frequency sensitive switching devices connect the loads to the conductors, and these switching devices are actuated in response to the control signals to energize only the desired loads.

It is in general an object of the invention to provide a new and improved system and method for controlling the energization of ballasted loads.

Another object of the invention is to provide a system and method of the above character which can be utilized without substantial modification of existing wiring.

Another object of the invention is to provide a system and method of the above character utilizing radio frequency control signals superimposed on power system conductors.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
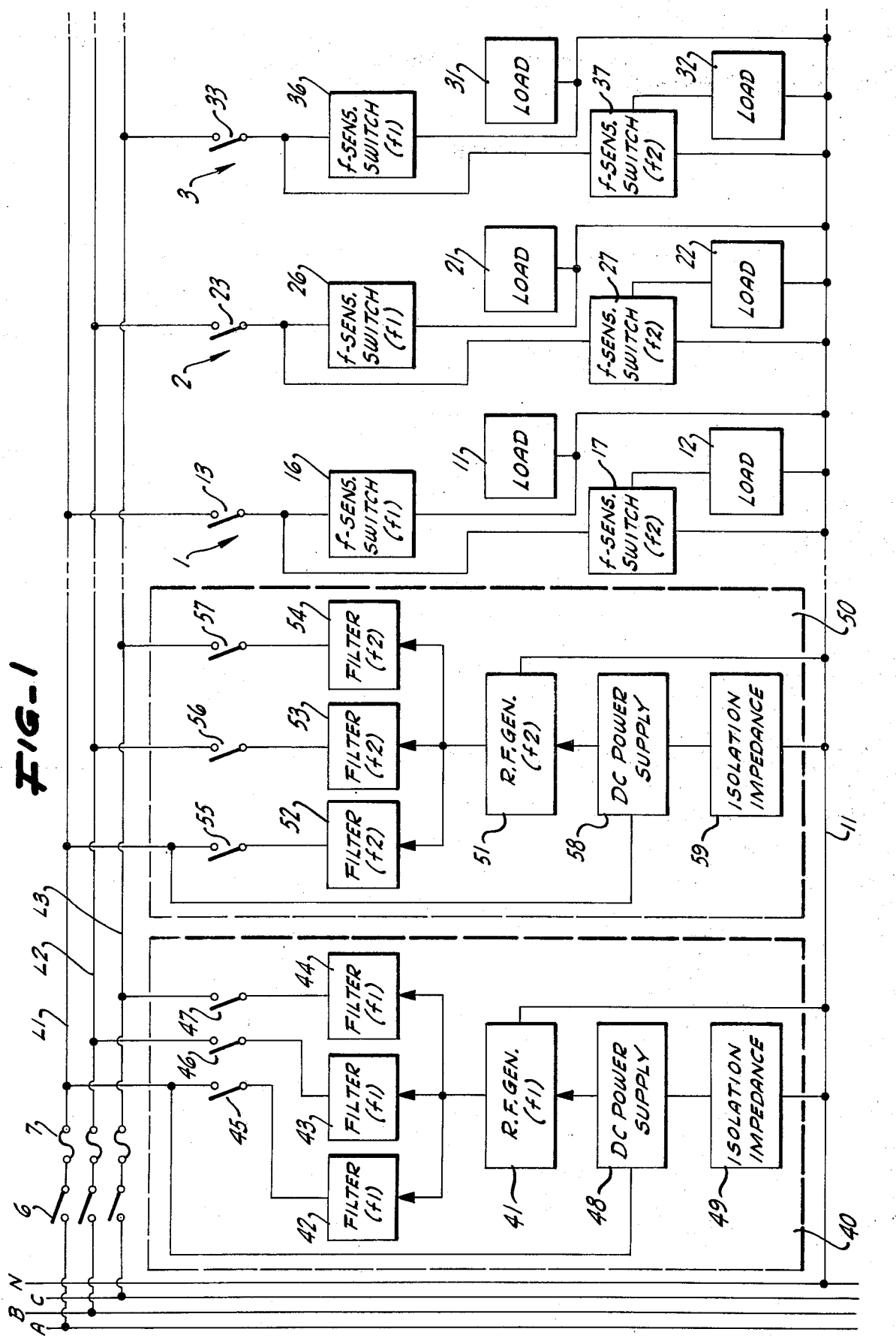
FIG. 1 is a block diagram of one embodiment of a ballasted load control system according to the invention.

In the drawings, the invention is illustrated in connection with a conventional three phase, four wire power distribution system of a type which is widely used in existing buildings. This system includes phase conductors A, B, C and a neutral conductor N which supply power to the building from an external source, typically at a line frequency of 60 Hz and an r.m.s. voltage of up to 600 volts between each of the phase conductors and the neutral conductor. Within the building, power is supplied to branch circuits 1, 2, 3 by line conductors L1, L2, L3 and a neutral conductor N connected to the phase and main neutral conductors at a distribution panel. While only three line conductors and branch circuits are shown, the number actually used in a building depends upon the power requirements of the building, and the branch circuits are generally arranged to distribute the loads on the phase conductors as equally as possible. Overcurrent and short current protection for the branch circuits is provided by circuit breakers 6 and fuses 7.

In each branch circuit, a number of loads, such as lights or other electrical appliances are commonly connected in parallel between the line and neutral conductors of the circuit. Energization of the loads is commonly controlled by one or more switches wired electrically in series with the loads. Thus, in branch circuit 1, loads 11 and 12 are connected in parallel between line conductor L1 and neutral conductor N, and energization of these loads is controlled by a switch 13 which can, for example, be a wall mounted switch. In branch circuit 2, loads 21 and 22 are connected in parallel between line conductor L2 and neutral conductor N, and energization of these loads is controlled by a switch 23 similar to switch 13. Likewise, in branch circuit 3, loads 31 and 32 are connected in parallel between line conductor L3 and neutral conductor N, and energization of these loads is controlled by a switch 33. In this discussion, it is assumed that loads 11–12, 21–22 and 31–32 are all ballasted loads such as flourescent lights. While switches 13, 23 and 33 provide means for turning all of the lights in a branch circuit on or off together, they do not permit individual control of the lights in the circuit.

In order to provide individual control of the lights in the branch circuits, frequency sensitive switches 16–17, 26–27 and 36–37 are provided. As discussed more fully hereinafter, the lights receive their power through these switches which are controlled by control signals superimposed on the power conductors at a convenient location.

Means is provided for applying control signals of predetermined frequency to the conductors of the branch circuits. The embodiment illustrated in FIG. 1 is a two-channel system having control signal sources 40 and 50 operating at frequencies $f1$ and $f2$, respectively.

Control signal source 40 includes a radio frequency generator 41 which operates at a frequency $f1$, preferably in the range of 25 to 60 KHz. The output of the RF generator is applied to the line conductors by coupling filter networks 42–44 and manually operable switches 45–47, respectively. The filter networks are tuned to the frequency $f1$, and they allow the output of the generator to be superimposed equally on the line conductors while at the same time preventing the line voltages from being applied to the output of the generator. Operating power for the generator is obtained from the AC power lines by a DC power supply 48, and an isolation impedance 49 is connected between the power supply and the neutral conductor to prevent the power lines from loading down the RF generator.

Control signal source 50 is similar to source 40 and includes an RF generator 51, coupling filter networks 52–54, switches 55–57, a DC power supply 58 and an isolation impedence 59. Generator 51 operates at a radio frequency $f2$, preferably in the 30–50 KHz range, and filters 52–54 are tuned to the frequency $f2$.

Figure 2:
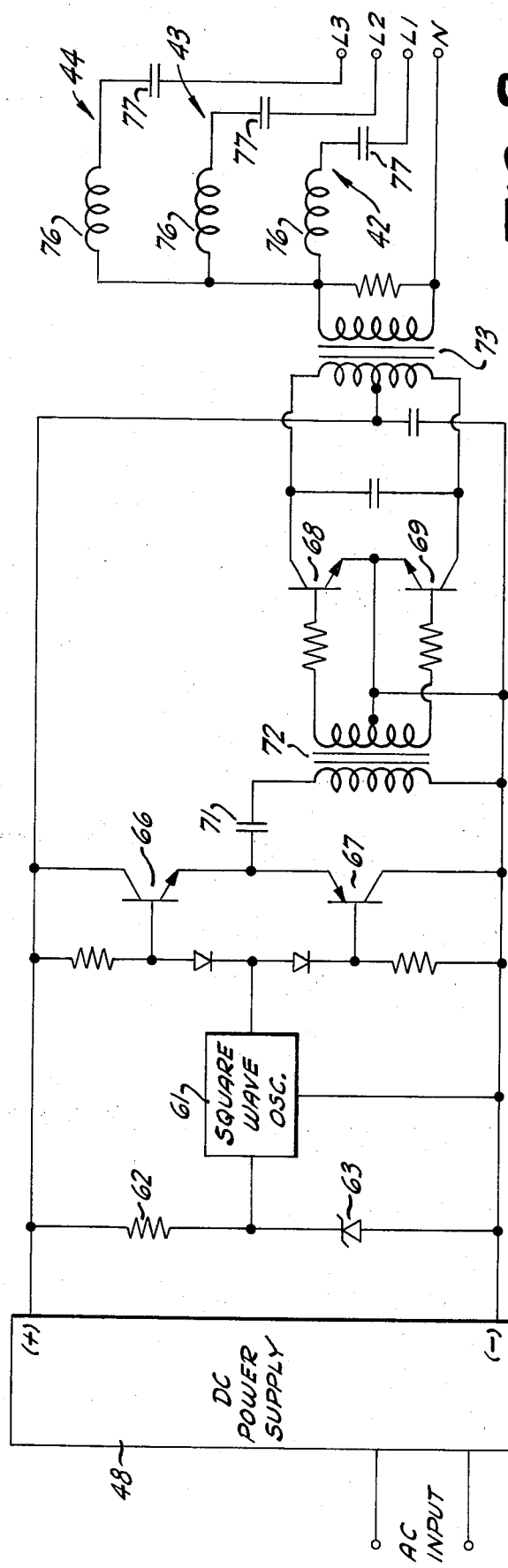
FIG. 2 is a circuit diagram, partly in block form, of a preferred control signal source for the system of FIG. 1.

A preferred circuit for source 40 is shown in detail in FIG. 2, and it will be understood that a similar circuit is used for source 50. The circuit includes a square wave oscillator 61 of known design which provides a square wave at the desired frequency $f1$. A regulated operating voltage for the square wave oscillator is obtained from power supply 48 by a voltage regulator comprising a dropping resistor 62 and Zener diode 63. The output of the square wave oscillator is applied to a buffer amplifier comprising transistors 66 and 67. The output of this amplifier is applied to a power amplifier comprising transistors 68 and 69 by a DC blocking capacitor 71 and a coupling transformer 72. The output of the power amplifier is transformed to a low impedance level (less than 1 ohm) by a transformer 73 and then applied to filters 42–44. Each of these filters is a series resonant circuit consisting of an inductor 76 and a capacitor 77 having values chosen to provide resonance at the frequency of the square wave oscillator. One end of the secondary winding of transformer 73 is connected directly to neutral conductor N, and the outputs of the filters are connected to line conductors L1–L3 by switches 45–47, respectively.

Figure 3:
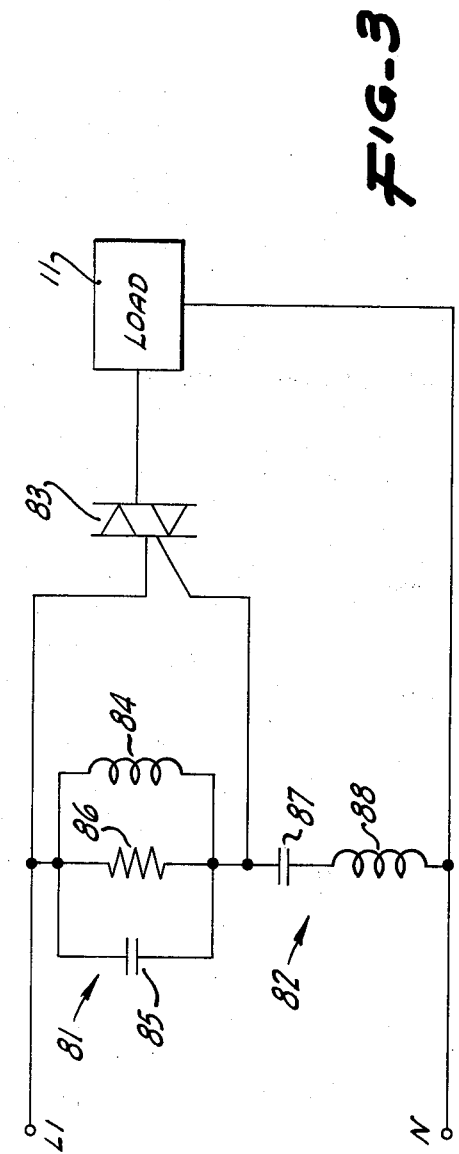
FIG. 3 is a circuit diagram of a preferred frequency sensitive switching circuit for the system of FIG. 1.

A preferred embodiment of frequency sensitive switch 16 is shown in detail in FIG. 3. This switch includes a parallel resonant tuned circuit 81, a series resonant tuned circuit 82, and a bidirectional thyristor 83, commonly known as a triac. Tuned circuit 81 includes an inductor 84, a capacitor 85 and a resistor 86, and tuned circuit 82 includes a capacitor 87 and an inductor 88. Both of these circuits are tuned to resonance at the frequency $f1$. The tuned circuits are connected in series between the line and neutral conductors, and the main terminals of the triac are connected to the line conductor and load. The gate of the triac is connected to the junction of the tuned circuits. Switches 17, 26–27 and 36–37 are similar to switch 16, except that in switches 17, 27 and 37 the tuned circuits are resonant at the frequency $f2$.

Control signal sources 40 and 50 can be mounted at any convenient location in the building, for example at or near the distribution panel, and frequency sensitive switches 16–17, 26–27 and 36–37 are most conveniently installed at the loads which they control.

Operation and use of the control system and therein the method of the invention can now be described. Initially, it is assumed that the line conductors are energized with AC power and that switches 13, 23 and 33 are closed. With switches 45–47 and 55–57 open, no control signals are superimposed on the line conductors, and all of the lights are off.

If one of the control switches is closed, for example switch 45, the RF control signal produced by generator 41 is applied to the corresponding line conductor, in this example L1. This signal is sensed by frequency sensitive switch 16 which is connected to line conductor L1 and tuned to the frequency of generator 41. The full control signal appears across the parallel resonant circuit of switch 16, causing triac 83 to turn on, energizing load 11. The same control signal is also applied to switch 17, but since the tuned circuits in this switch are not resonant at the frequency of generator 41, the control signal is passed by the parallel resonant circuit and blocked by the series resonant circuit, with the result that the triac in the switch and the load connected to the switch remain deenergized.

Likewise, if one of the control switches in source 50 is closed, a control signal having a frequency $f2$ will be applied to the line conductor, and the light controlled by the switch responsive to this frequency in the branch circuit to which the signal is applied will be energized. For example, closing switch 56 will cause light 22 to be energized.

In practice, it is anticipated that most of the control switches will ordinarily be closed so that most of the lights will be energized. It is further anticipated that the settings of switches 45–47 and 55–57 will be changed only when the amount or pattern of illumination is to be changed and that day-to-day operation of the lights will be controlled by switches 13, 23 and 33.

The invention has a number of important features and advantages. It permits the energization of loads throughout a building to be controlled on an individual basis, and it is particularly suitable for use with ballasted loads, such as flourescent lights, since no power is applied to deenergized loads. The invention can be utilized with the existing wiring in a building with very little modification of the wiring. The triacs in the frequency sensitive switching circuits are actuated directly by the RF control signals, minimizing the number of components required. The system is economical to manufacture and easy to install.

It is apparent from the foregoing that a new and improved system and method for controlling the energization of ballasted loads has been provided. While only the presently preferred embodiments have been described, as will be apparent to those familiar with the art, certain changes and modifications can be made without departing from the scope of the invention as defined by the following claims.

I claim:

1. In a system for controlling the energization of a ballasted load with a radio frequency control signal imposed on power circuit conductors carrying operating power for the load: means for connecting one side of the ballasted load to a first one of the power circuit conductors, a solid state switching device having first and second terminals and a control gate for controlling conductivity between the terminals, means for connecting the first and second terminals of the switching device respectively to a second side of the ballasted load and to a second one of the power circuit conductors, an impedance element connected between the control gate and the second terminal of the switching device, a series resonant circuit adapted to pass the control signal and block the operating power, and means for connecting the resonant circuit between the control gate of the switching device and the first power circuit conductor whereby the radio frequency control signal is developed across the impedance element and applied to the gate of the switching device to actuate the same.

2. The system of claim 1 wherein the control signal has a frequency on the order of 30 KHz to 50 KHz.

3. The system of claim 1 wherein the switching device is a triac.

4. The system of claim 1 wherein the control signal is generated in the form of a square wave.

5. In a power system: a ballasted load, a power circuit comprising first and second electrically energized conductors carrying power for the load, means for applying a control signal having a frequency on the order of 30 KHz to 50 KHz to the power circuit remotely of the load, a triac connected between the first conductor and one side of the load, the second side of the load being connected to the second conductor, an impedance element connected between the first conductor and the gate of the triac, and a series circuit resonant at the frequency of the control signal connected between the gate of the triac and the second conductor, whereby the control signal is developed across the impedance element to actuate the triac and thereby cause power to be delivered to the load.

6. The system of claim 5 wherein the control signal is generated in the form of a square wave.

7. The system of claim 5 wherein the series circuit comprises a capacitor and an inductor.

* * * * *

UNITED STATES PATENT OFFICE
CERTIFICATE OF CORRECTION

Patent No. 3,971,010     Dated July 20, 1976

Inventor(s) Robert C. Foehn and Lester L. Libby

It is certified that error appears in the above-identified patent and that said Letters Patent are hereby corrected as shown below:

The patent should be referred to as Foehn et al., and the inventors named in the patent should be Robert C. Foehn, Novato, California and Lester L. Libby, Los Altos Hills, California.

Signed and Sealed this

Thirteenth Day of June 1978

[SEAL]

Attest:

RUTH C. MASON
*Attesting Officer*

DONALD W. BANNER
*Commissioner of Patents and Trademarks*